Patented July 10, 1923.

1,461,444

UNITED STATES PATENT OFFICE.

WALLACE W. GREENWOOD, OF WORCESTER, MASSACHUSETTS, ASSIGNOR TO NORTON COMPANY, OF WORCESTER, MASSACHUSETTS, A CORPORATION OF MASSACHUSETTS.

MAGNESIA REFRACTORY.

No Drawing.　　Application filed February 28, 1919.　Serial No. 279,881.

*To all whom it may concern:*

Be it known that I, WALLACE W. GREENWOOD, a citizen of the United States of America, residing at Worcester, in the county of Worcester and State of Massachusetts, have invented certain new and useful Improvements in Magnesia Refractories, of which the following is a full, clear, and exact specification.

My invention relates to refractory articles and cements and more particularly to refractories containing magnesia.

Owing to its high melting point and to its basic character, magnesia is of great utility in the refractory field for furnace linings, for covering resistance wires in electrical heating apparatus and for similar heat-resisting uses. For such purposes magnesia is ordinarily mixed with a bonding material, made plastic with water, dried in a desired shape and then fired to set the bond. However, its use has involved many difficulties owing to the great affinity of magnesia for water, the tendency of the bonded material to crack and shrink during drying and its excessive shrinkage under high heat treatment.

It is now found that magnesia that has been shrunk, sintered or fused, as in the electric furnace or by other suitable means, in whole or in part, does not possess the objectionable characteristics which are prominent in the ordinary unfused or calcined magnesia and is very serviceable as a refractory material.

It is accordingly an object of my invention to provide a refractory composition of prefused magnesia, which may be formed in plastic condition and permanently set by heat treatment, which will withstand high temperatures; and which will not crack upon drying, or shrink to a deleterious extent when subjected to high temperatures, but will retain its original shape and form a satisfactory and permanent heat resistant body. Further objects will be apparent in the following disclosure.

In accordance with my invention, I propose to utilize this prefused magnesia for refractory purposes by combining therewith a heat-resistant bonding material which will bond the magnesia granules together under the application of heat and otherwise serve to make shaped articles thereof. For this bond, I preferably utilize a plastic ceramic material, such as ball clay, which is capable of being vitrified at a high temperature. To overcome any tendency for magnesia and such plastic clay to crack during drying or heating, I may incorporate therewith dehydrated or calcined gypsum, such as plaster of Paris.

As a specific example of one composition of matter adapted for forming refractory articles or a cement I may utilize these ingredients in the following proportions:

Prefused magnesia, 82% by weight.
Plaster of Paris, 3% by weight.
Ball clay, 15% by weight.

I have found that the plaster of Paris should ordinarily be present in amounts greater than 2% but less than 8%, since the lesser amounts do not produce the desired effect while with larger proportions the individual characteristics of the plaster become noticeable and objectionable. It moreover is feasible to vary the ceramic material as by incorporating other bonding ingredients, which are well known in the ceramic art, with the ball clay to change the vitrifying point, the plasticity of the mass, the strength of the bond, etc.

The fusion point of this mixture obviously depends upon the amount of the ceramic bond ingredients present. The relative proportions of the clay material and magnesia may be varied widely, the limit being that sufficient clay material should be present to bond the magnesia and that it should not be in such large amounts as to seriously lower the refractory qualities of the mixture. For a highly refractory body, the magnesia grains will form the major portion of the article, the amount of bond being a minimum consistent with producing a sufficiently strong article to withstand loads or other strains under the normal conditions of use. It is found, for example, that a mixture of 64 parts of magnesia with 36 parts of clay will fuse at a temperature of about Seger cone 29 while the mixture set forth in the above table will fuse at a considerably higher temperature.

This composition, when mixed with water may be used as a cement, motor or plastic mixture and formed in desired shapes by well known methods such as casting, pressing, jiggering, etc. It is heat set either in a preliminary firing operation or in situ by being subjected to a temperature around 900° centigrade or such heat conditions as will vitrify the clay material.

Due to the presence of the strongly basic calcium oxide and magnesium oxide, the silica present in the clay is unable to seriously attack any metallic oxide which might be formed on nickel or chromium resistance wires. Therefore this combination is particularly adapted for surrounding electrical resistance bodies made of nickel, chromium, and similar oxidizable metals. I find it particularly desirable to utilize this material not only for embedding resistance wires wound on a magnesia tube but also as a covering for a tube made of bonded crystalline alumina. It obviously has many and varied uses well known to refractory workers.

I claim:—

1. A composition of matter comprising preshrunk magnesia grains forming the major portion of the total mass and a ceramic bond proportioned and constituted to unite the grains into a super-refractory body which will withstand drying and firing without detrimental shrinkage.

2. A composition of matter for a molded ceramic article comprising previously fused magnesia and a ceramic binder containing an ingredient capable of preventing deleterious cracking of the article during drying.

3. A super-refractory article comprising prefused magnesia grains forming at least 64% of the total mass bonded by a ceramic material which will withstand temperature changes without detrimental shrinkage.

4. A refractory composition of matter comprising previously fused magnesia, calcined gypsum, and a heat resistant binder therefor.

5. A refractory article comprising previously fused magnesia, grains united by a bond of vitrified ceramic material containing plaster of Paris.

6. A refractory composition of matter comprising previously fused magnesia, a plastic clay material and at least 2% by weight of plaster of Paris.

7. A highly refractory article comprising previously fused magnesia, and a relatively small amount of bond containing vitrified clay material and from 2% to 8% by weight of plaster of Paris.

8. A refractory composition of matter comprising previously fused magnesia, a ball clay and sufficient plaster of Paris to prevent cracking of the mass when shaped and subjected to heat.

Signed at Worcester, Massachusetts, this 26th day of February, 1919.

WALLACE W. GREENWOOD.